(12) United States Patent
Sasaki et al.

(10) Patent No.: US 9,255,013 B2
(45) Date of Patent: Feb. 9, 2016

(54) METHOD FOR PRODUCING HEMATITE FOR IRONMAKING

(71) Applicant: Sumitomo Metal Mining Co., Ltd., Tokyo (JP)

(72) Inventors: Hideki Sasaki, Minato-ku (JP); Yoshitomo Ozaki, Niihama (JP); Manabu Enomoto, Niihama (JP); Hirofumi Shouji, Niihama (JP); Tatsuya Higaki, Niihama (JP); Hiroyuki Mitsui, Minato-ku (JP); Yasumasa Kan, Minato-ku (JP)

(73) Assignee: Sumitomo Metal Mining Co., Ltd. (JP)

( * ) Notice: Subject to any disclaimer, the term of this patent is extended or adjusted under 35 U.S.C. 154(b) by 0 days.

(21) Appl. No.: 14/386,172

(22) PCT Filed: Jan. 16, 2013

(86) PCT No.: PCT/JP2013/050669
§ 371 (c)(1),
(2) Date: Sep. 18, 2014

(87) PCT Pub. No.: WO2013/140836
PCT Pub. Date: Sep. 26, 2013

(65) Prior Publication Data
US 2015/0023851 A1    Jan. 22, 2015

(30) Foreign Application Priority Data

Mar. 19, 2012   (JP) .................. 2012-062793

(51) Int. Cl.
*C01G 49/00* (2006.01)
*C01G 49/06* (2006.01)
*C22B 3/44* (2006.01)

(52) U.S. Cl.
CPC . *C01G 49/06* (2013.01); *C22B 3/44* (2013.01); *C01P 2004/61* (2013.01)

(58) Field of Classification Search
None
See application file for complete search history.

(56) References Cited

U.S. PATENT DOCUMENTS

2009/0148366 A1   6/2009   Roche et al.
2010/0135878 A1   6/2010   Shibayama et al.

FOREIGN PATENT DOCUMENTS

AU   2009212947   4/2010
EP   1777304      4/2007

(Continued)

OTHER PUBLICATIONS

International Search Report dated Apr. 23, 2013.

*Primary Examiner* — Steven Bos
(74) *Attorney, Agent, or Firm* — Gerald E. Hespos; Michael J. Porco; Matthew T. Hespos

(57) ABSTRACT

Provided is a method for producing hematite for ironmaking, wherein high purity hematite, which can be used as an ironmaking raw material, is cheaply and efficiently recovered from a leach residue containing iron oxide produced by a high pressure acid leach (HPAL) process. This method for producing (high purity) hematite for ironmaking in a process of adding a mineral acid and an oxidant to ore containing iron and valuable metals and then leaching the valuable metals under high pressure and high temperature includes (1) a neutralization step of adding a neutralizer to a leachate obtained under high pressure and high temperature to form a leach slurry, (2) a solid-liquid separation step of separating the leach slurry obtained in the neutralization step (1) into a leach residue and the leachate, and (3) a classification step of classifying the leach residue into the hematite and gangue components.

7 Claims, 3 Drawing Sheets

(56) References Cited

FOREIGN PATENT DOCUMENTS

| | | |
|---|---|---|
| JP | 6279881 | 4/1994 |
| JP | 200770708 | 3/2007 |
| JP | 200798187 | 4/2007 |
| JP | 200881766 | 4/2008 |
| JP | 2009-520661 | 5/2009 |
| JP | 4294685 | 7/2009 |
| JP | 2010-95788 | 4/2010 |
| JP | 2010-126778 | 6/2010 |
| JP | 201151850 | 3/2011 |
| JP | 2011195920 | 10/2011 |

METHOD FOR PRODUCING HEMATITE FOR IRONMAKING

BACKGROUND

1. Field of the Invention

The present invention relates to a method for producing hematite for ironmaking, in which high-purity hematite, which can be used as an iron-making raw material in place of iron ore, is produced by a wet process.

2. Description of the Related Art

In steel smelting, a method of charging iron ore containing iron oxide into a blast furnace along with a reductant such as coke, heating and melting the iron ore under a reducing atmosphere to obtain crude steel, and refining the crude steel in a converter to obtain desired steel has been used.

The iron oxide that is a raw material of the steel is a limited resource, and furthermore it is gradually hard to obtain high-quality iron ore required to maintain a quality of steel.

Meanwhile, with respect to nickel becoming a raw material of stainless steel, technology for smelting low-grade oxide ore as a raw material due to a tendency toward resource exhaustion of sulfide ore that has been used in the past has been developed and put to practical use.

To be specific, nickel oxide ore such as limonite or saprolite is put into a pressure device such as an autoclave along with a sulfuric acid, and nickel is leached under high pressure and high temperature of about 240 to 260° C.

The nickel leached into a solution of the sulfuric acid is used as nickel metal or a nickel salt compound by adding a neutralizer to neutralize a surplus acid, separating a leach residue by solid-liquid separation, separating impurities to recover the leach residue as an intermediate raw material in the form of hydroxide or sulfide, and further refining the intermediate raw material.

In such a process called high pressure acid leach (HPAL), nickel can be almost completely leached even from low-grade ore in which valuable metals intended for recovery are contained by not more than 1% to 2%. Further, the HPAL process has a feature of concentrating the valuable metals up to the same grade as a conventional raw material by producing an intermediate raw material from a leachate, and refining the nickel in a process similar to a conventional process.

Further, the HPAL process may be applied to various types of ores such as nickel sulfide ore, copper sulfide ore, and copper oxide ore, in addition to the nickel oxide ore.

Further, a main component of the leach residue obtained by the HPAL process is iron oxide having the form of hematite. This is secondarily obtained because each of oxide ore and sulfide ore of nickel or copper used as a raw material contains iron of an amount far more than a content of nickel or copper.

These leach residues are created at a high temperature, and thus have the form of oxide that is chemically or environmentally stable. However, the leach residues have no special utility value, and have been scrapped to a residue disposal yard. For this reason, it has been a grave challenge how to secure the disposal yards for an enormous amount of leach residues generated along with the smelting.

Furthermore, the leach residue of the HPAL process cannot be used for the aforementioned iron-making raw material. The reason is that the leach residue of the HPAL process also contains gangue and impurities in addition to the iron oxide, and thus is not suitable for the iron-making raw material.

Particularly, calcium is not preferred as the iron-making raw material, and generally needs to be suppressed to a level of 0.1% or less. For example, in the case of the nickel oxide ore, the calcium is hardly contained in the ore, but as described above, the calcium is derived from quicklime or limestone added to neutralize the surplus acid contained in a leach slurry, and is precipitated in the form of calcium sulfate along with the neutralization.

Therefore, an attempt to use a neutralizer such as magnesium hydroxide or magnesium oxide which contains no calcium has been made. However, in comparison with the calcium neutralizers, the magnesium hydroxide has good reactivity, but is expensive to lead to supply instability, and is unfit for industrial massive use. Additionally, a neutralizer such as sodium hydroxide is too expensive to be practical industrially.

Thus, to increase supply stability and to achieve lower costs, magnesium contained in the ore itself has been considered to be used as the neutralizer.

For example, JP 2009-520661 A discloses a method of recovering magnesium oxide from a source of magnesium sulfate, which includes a process of preparing a source of solution-state magnesium sulfate obtained from a part of a process associated with leaching of metal-containing ore or concentrate, a process of converting the solution-state magnesium sulfate into solid magnesium sulfate, a process of bringing the solid magnesium sulfate into contact with elemental sulfur under a reducing atmosphere, and a process of recovering magnesium as magnesium oxide gas and sulfur as sulfur dioxide gas.

With the use of this method, the magnesium contained in the ore can be reused as the neutralizer, and suppress the introduced calcium, so that it is possible to reduce the calcium mixed into the iron oxide in the residue.

However, the method of JP 2009-520661 A requires a large quantity of heat to crystallize the magnesium in the solution as the magnesium sulfate or to heat the obtained magnesium sulfate into the magnesium oxide, and is far from an economical method.

In contrast, there is a proposal for a method of using, as a neutralizer, a host rock (also called a bedrock or a foundation rock) which is not typically a target to be used as a resource and which is simultaneously mined from a site where nickel oxide ore is mined.

The host rock has a composition shown in, for instance, Table 1, and has a feature of being rich in magnesium. The magnesium contained in the host rock is mainly magnesium oxide, and can also be used as a neutralizer.

TABLE 1

|  | Ni | Fe | Co | Si | Mg | Cr | Al |
|---|---|---|---|---|---|---|---|
| Host Rock | 0.22 | 4.92 | <0.02 | 17.4 | 22.1 | 0.26 | 0.13 |

|  | Mn | Ca | S |
|---|---|---|---|
| Host Rock | 0.09 | 0.08 | <0.05 |

For example, JP 4294685 B1 discloses a method of recovering nickel or cobalt from oxide ore containing nickel or cobalt and iron, which method includes a process of preparing, as the oxide ore, first oxide ore and second oxide ore having a higher magnesium content than the first oxide ore; a classification process of classifying the first oxide ore into first small particle size oxide ore and first large particle size oxide ore and classifying the second oxide ore into second small particle size oxide ore and second large particle size oxide ore; a process of leaching the nickel or the cobalt from the first large particle size oxide ore using a sulfuric acid and obtaining a sulfuric acid leachate containing the nickel or the cobalt and a leach residue; a reacting process of mixing the sulfuric acid leachate containing the leach residue and the second large particle size oxide ore, reacting the sulfuric acid leachate with the magnesium contained in the second large particle size oxide ore to adjust pH, and obtaining a reaction solution containing the nickel or the cobalt and a reaction residue containing the iron; and a neutralization process of neutralizing the reaction solution containing the reaction residue using a neutralizer and obtaining a neutralization solution containing the nickel or the cobalt and a neutralized residue containing the iron.

With the use of this method, the nickel oxide ore itself can be used as the neutralizer.

However, costs and labor for classifying the ore are unable to be disregarded. In addition, many gangue components are also present in the leach residue, and an iron grade is low as it is, so that the nickel oxide ore is far from an efficient raw material.

The invention is intended to provide a method for producing hematite for ironmaking, capable of recovering high-purity hematite, which can be used as an iron-making raw material, from a leach residue containing iron oxide produced by a high pressure acid leach (HPAL) process in an inexpensive and efficient way.

SUMMARY OF THE INVENTION

To solve the above problems, the invention provides a method for producing (high purity) hematite for ironmaking by a process of adding a mineral acid and an oxidant to ore containing iron and valuable metals and then leaching the valuable metals under high pressure and high temperature, and the method further includes the following steps (1) to (3):

(1) a neutralization step of adding a neutralizer to a leachate obtained under high pressure and high temperature to form a leach slurry;

(2) a solid-liquid separation step of separating the leach slurry obtained in the neutralization step (1) into a leach residue and the leachate; and (3) a classification step of classifying the leach residue obtained by the solid-liquid separation step into the hematite and gangue components.

The neutralizer to be added to the leachate may be magnesium oxide or magnesium hydroxide.

A two-stage neutralization process may be performed in the neutralization step. The two-stage neutralization process may have a first neutralization process in which the magnesium oxide is used as the neutralizer, and following the first neutralization process, a second neutralization process in which the magnesium hydroxide is used as the neutralizer depending on a concentration of a free acid of the leachate.

The magnesium oxide may be a host rock.

The magnesium oxide may be magnesium oxide obtained by acid leaching oxide ore containing magnesium, crystallizing a crystal of a magnesium salt from the leachate, and performing oxidizing roasting on the obtained salt.

The neutralizer supplied in the neutralization step may be a neutralizer sieved in a particle size range from 10 μm to 500 μm.

The classification of the leach residue in the classification step may be performed using a wet cyclone as a classification device.

The classification of the leach residue in the classification step may be performed by selecting a sieve mesh to be sieved so as to be in a range of 5 μm or less.

The ore containing iron and valuable metals may be any of nickel oxide ore, nickel sulfide ore, and copper sulfide ore.

The present invention can bring about several industrially significant effects. First a low calcium grade of hematite that may be used as an iron-making raw material can be obtained. Second, a raw material can be supplied in an inexpensive and stable way. Third, an amount of a scrapped leach residue can be remarkably reduced, which makes it possible to remarkably reduce costs by lowering an environmental risk, reducing scrapping costs, and further reducing construction costs of a leach residue disposal yard. Fourth, when the invention is carried out, a special facility is not required, and easy establishment of a process and practice at a low cost is achieved.

DETAILED DESCRIPTION

In the present invention, when a mineral containing iron and valuable metals such as nickel oxide ore is leached in a sulfuric acid under high pressure, calcium-free host rock or magnesium oxide is used as a neutralizer that is added to neutralize a surplus acid thereof, an obtained leach residue is classified to concentrate hematite using a wet cyclone, and the hematite in the leach residue is concentrated so that a grade of thereof is more than about 70% to 80%, whereby high-purity hematite that can be used as an iron-making raw material is efficiently produced.

To this end, the present invention provides a method for producing hematite through a producing process of adding a mineral acid and an oxidant to ore containing iron and valuable metals and leaching the valuable metals under high pressure and high temperature, and the method is characterized by going through further processes (1) to (3) below:

(1) A neutralization step of adding a neutralizer to a leachate obtained under high pressure and high temperature to form a leach slurry;

(2) A solid-liquid separation step of separating the leach slurry obtained in the neutralization step (1) into a leach residue and the leachate; and (3) A classification step of classifying the leach residue into the hematite and gangue components.

Hereinafter, each process will be described in more detail with reference to the drawings.

Figure 1:
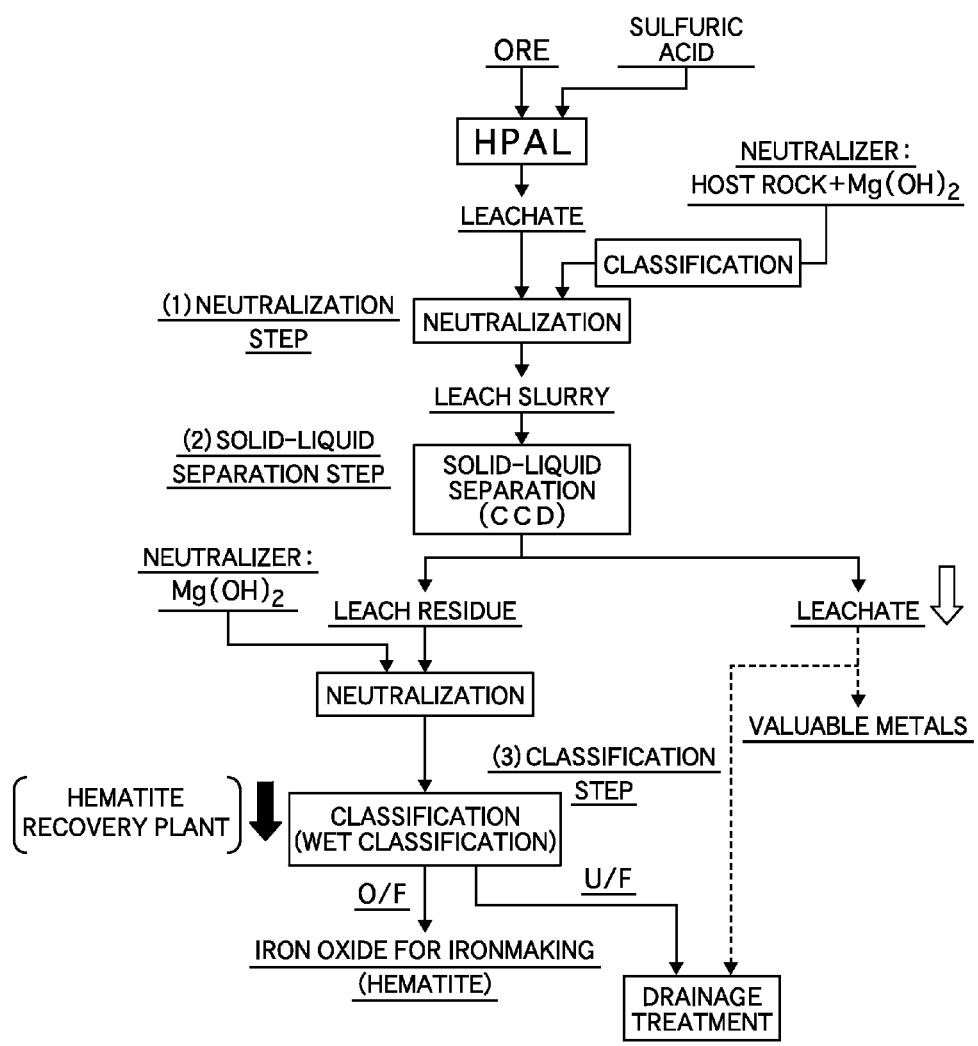
FIG. 1 is a flow chart illustrating a method for producing hematite in a producing process of adding a mineral acid and an oxidant to ore containing iron and valuable metals and then leaching the valuable metals under high pressure and high temperature according to the present invention.

FIG. 1 is a flow chart illustrating a method for producing hematite in a producing process of adding a mineral acid and an oxidant to ore containing iron and valuable metals and then leaching the valuable metals under high pressure and high temperature according to the present invention. The valuable metals contained in the ore are produced according to a flow indicated by an outline arrow of FIG. 1. On the other hand, hematite that is a by-product of the producing process is refined according to a black arrow.

Neutralization Step

Figure 2:
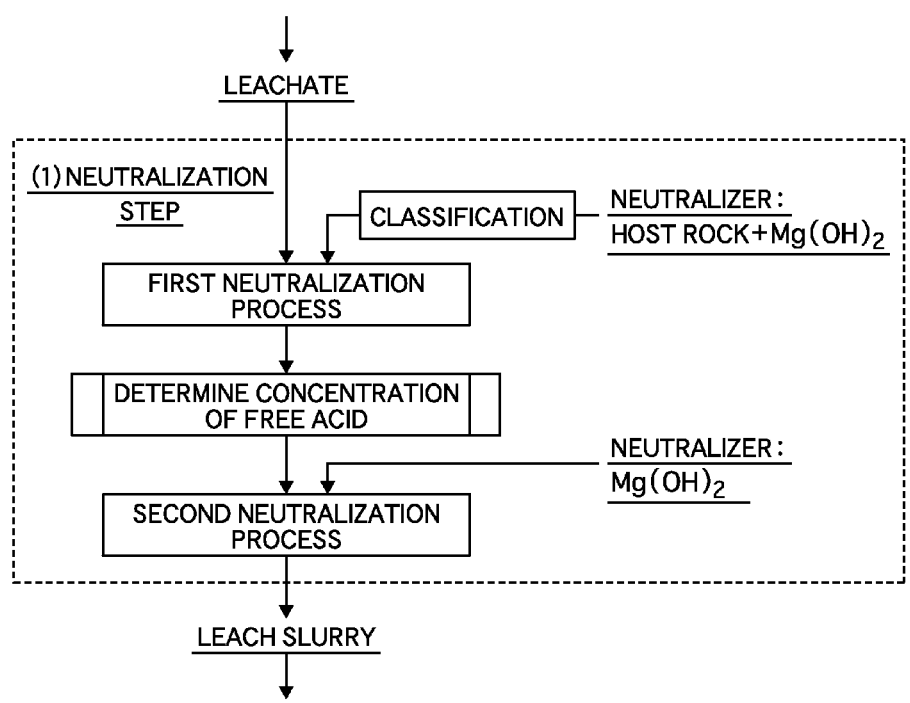
FIG. 2 is a flow chart illustrating the neutralization step (1), and showing a two-stage neutralization process of using a proper neutralizer depending on a concentration of a free acid.

In this neutralization step, magnesium oxide or magnesium hydroxide is used as a neutralizer. However, as illustrated in FIG. 2, depending on a concentration of a free acid of the leachate in the neutralization step, a two-stage neutralization process is performed in which a first neutralization process with the use of the magnesium oxide as the neutralizer is performed, and then a second neutralization process with the use of the magnesium hydroxide as the neutralizer is performed.

1. First Neutralization Process

Therefore, in the invention, first, the magnesium oxide, particularly a host rock showing a representative example of a component composition in Table 1, is used as the neutralizer. Thereby, the neutralization is advanced while suppressing mixing of calcium, and simultaneously the concentration of the free acid in the leachate is measured.

2. Second Neutralization Process

In the neutralization process, as the concentration of the free acid is reduced, reactivity with the neutralizer tends to be reduced. As such, an unreacted neutralizer remains as a neutralized residue, and a problem of causing a new issue in using the residue or increasing a cost of the neutralizer may occur.

Therefore, in the invention, a two-stage neutralization process of using a neutralizer such as a host rock having relatively low reactivity at the start of the neutralization, and replacing the neutralizer with a neutralizer such as magnesium hydroxide by which reactivity is well minutely adjusted with ease when the free acid concentration reaches 4 g/L is used, and the neutralization efficiency is improved with accuracy.

Solid-Liquid Separation Step

A solid-liquid separation step is performed using a known method such as counter current decantation (CCD) during operation, and solid-liquid separates a neutralized leach slurry going through the neutralization step into a leach residue and a leachate.

The leachate is smelt into valuable metals via an intermediate product such as a nickel sulfate solution.

The leach residue goes to a "hematite recovery plant" of FIG. 1, is provided to a classification step (3), and refines iron oxide (high-purity hematite) for ironmaking.

Classification Step

Therefore, the host rock is used to neutralize a surplus acid in the leach slurry. After the solid-liquid separation, a leach residue thereof (hereinafter referred to as a "neutralized residue" for the purpose of discrimination) undergoes classification using a wet cyclone (wet classification). Thereby, a grade of the hematite is increased by concentrating the hematite at a small particle size side of the neutralized residue (an overflow (O/F) side of the wet cyclone) and concentrating materials other than the hematite at a large particle size side (an underflow (U/F) side of the wet cyclone).

Influence of Particle Size of Host Rock

Further, a particle size of the host rock used in the first neutralization process is adjusted to an optimum range by pulverization.

To be specific, if the particle size of the host rock has a range not exceeding 500 μm, there is no difference in neutralization performance. Further, when the wet cyclone is used for the classification, the larger the particle size of a material intended for classification removal, the higher the classification accuracy can be. As such, the particle size of the host rock is adjusted to a range of not more than 500 μm, and preferably to become an average particle size of about 150 μm in view of a facility load. Thereby, the grade of the hematite is increased by distributing gangue other than the hematite to the U/F side.

EXAMPLES

Hereinafter, the invention will be described in detail using examples.

Example 1

Nickel oxide ore having 1% nickel grade and 46 to 48% iron grade was adjusted to be a slurry of 30 to 40% by weight, and then was mixed with sulfuric acid of 98% by weight. Subsequently, the slurry was charged into a pressure device, heated to 240 to 250° C., and maintained for one hour, and nickel in the ore was leached.

After the leaching, the slurry was cooled to about 70° C., and then a host rock that had a composition shown in Table 1 and was mined from the same mine was added to neutralize a surplus acid.

Subsequently, the slurry containing a neutralized residue after the surplus acid was neutralized was subjected to solid-liquid separation using Nutsche and a filtering bottle, and was separated into a leachate and the neutralized residue. An iron grade of the neutralized residue was 49.9% (71.4% calculated in terms of a hematite grade).

Next, the obtained neutralized residue was charged into a wet cyclone, and was classified into an underflow (U/F) and an overflow (O/F).

Classification conditions are illustrated in Table 2, and a change in the iron grade of O/F and U/F of the neutralized residue according to classification is illustrated in Table 3.

It is found that a high-pressure sulfuric acid leach residue neutralized with the host rock is classified by the wet cyclone, and thereby the hematite can be concentrated, and the grade of the hematite which was about 70% at the time of charging can be increased to 80% or more.

TABLE 2

| Sample | Supply Pressure [Bar] | Supply Amount [m³/h] | Feed Liquid Slurry [t/h] | Slurry Concentration [%] | | |
|---|---|---|---|---|---|---|
| | | | | Charge | O/F | U/F |
| 1 | 3.5 | 3.75 | 1.15 | 24.8 | 23.2 | 54.9 |
| 2 | 1.4 | 2.30 | 0.70 | 24.7 | 23.4 | 53.8 |
| 3 | 0.5 | 1.31 | 0.41 | 25.0 | 24.2 | 49.1 |
| 4 | 3.5 | 3.93 | 0.60 | 13.7 | 12.7 | 43.5 |
| 5 | 1.8 | 2.71 | 0.41 | 13.5 | 12.7 | 46.2 |
| 6 | 3.5 | 3.50 | 0.32 | 8.5 | 7.81 | 41.3 |
| 7 | 3.5 | 2.63 | 0.23 | 8.4 | 7.71 | 24.5 |

TABLE 3

| Sample | O/F | U/F |
|---|---|---|
| 1 | 81.4 | 25.6 |
| 2 | 80.8 | 25.5 |
| 3 | 80.2 | 29.3 |
| 4 | 81.9 | 24.5 |
| 5 | 83.1 | 22.2 |
| 6 | 84.1 | 21.2 |
| 7 | 84.7 | 32.7 |

Charge: $Fe_2O_3$ 71.4%

A rise in the Fe grade was observed even on any conditions illustrated in Table 3.

Sample No. 1 can be determined to be optimum.

In addition, distributions (%) to the overflow (O/F) and underflow (U/F) sides of each element according to the classification by the wet cyclone are also illustrated in Table 4.

Iron is concentrated to the O/F side, whereas magnesium is concentrated to the U/F side. Silicon is almost equally distributed to the O/F side and the U/F side. Further, aluminum is distributed to the U/F side by about 40%.

In this way, impurities tends to be concentrated and distributed to the U/F, and the hematite where a proportion distributed to the O/F side as much is high is increased and concentrated.

Si and Al are preferably distributed to the U/F, which leads to upgrade of the hematite so much, and thus an effect is present. Even in the distribution of 30 to 40%, an effect can be expected such as to be distributed to the U/F. Further, it is considered to be good that, in view of wear resistance of the facility, a grade of Si (SiO2) becomes low, and an effect can be confirmed by the distribution to the U/F.

TABLE 4

| Sample | Fe O/F | Fe U/F | Mg O/F | Mg U/F | Si O/F | Si U/F | Al O/F | Al U/F |
|---|---|---|---|---|---|---|---|---|
| 1 | 96.0 | 4.0 | 27.9 | 72.1 | 51.8 | 48.2 | 58.4 | 41.6 |
| 2 | 96.7 | 3.3 | 36.5 | 63.5 | 61.1 | 38.9 | 60.1 | 39.9 |
| 3 | 97.5 | 2.5 | 52.1 | 47.9 | 74.3 | 25.7 | 76.1 | 23.9 |
| 4 | 96.7 | 3.3 | 28.4 | 71.6 | 51.7 | 48.3 | 59.4 | 40.6 |
| 5 | 97.8 | 2.2 | 36.5 | 63.5 | 62.5 | 37.5 | 67.5 | 32.5 |
| 6 | 97.3 | 2.7 | 26.9 | 73.1 | 51.1 | 48.9 | 54.2 | 45.8 |
| 7 | 95.3 | 4.7 | 26.8 | 73.2 | 49.5 | 50.5 | 60.8 | 39.2 |

When the host rock was used as the neutralizer, the neutralizer to be added to the leach slurry was pulverized and added to become each particle size, and a time which it took to complete the neutralization was compared. Here, if a free acid was neutralized until it was completely eliminated, there would be a disadvantage, for instance, that settlement occurs in an excessive case. As such, a point at which the free acid became a concentration of 4 g/L was set to an end point.

Figure 3:
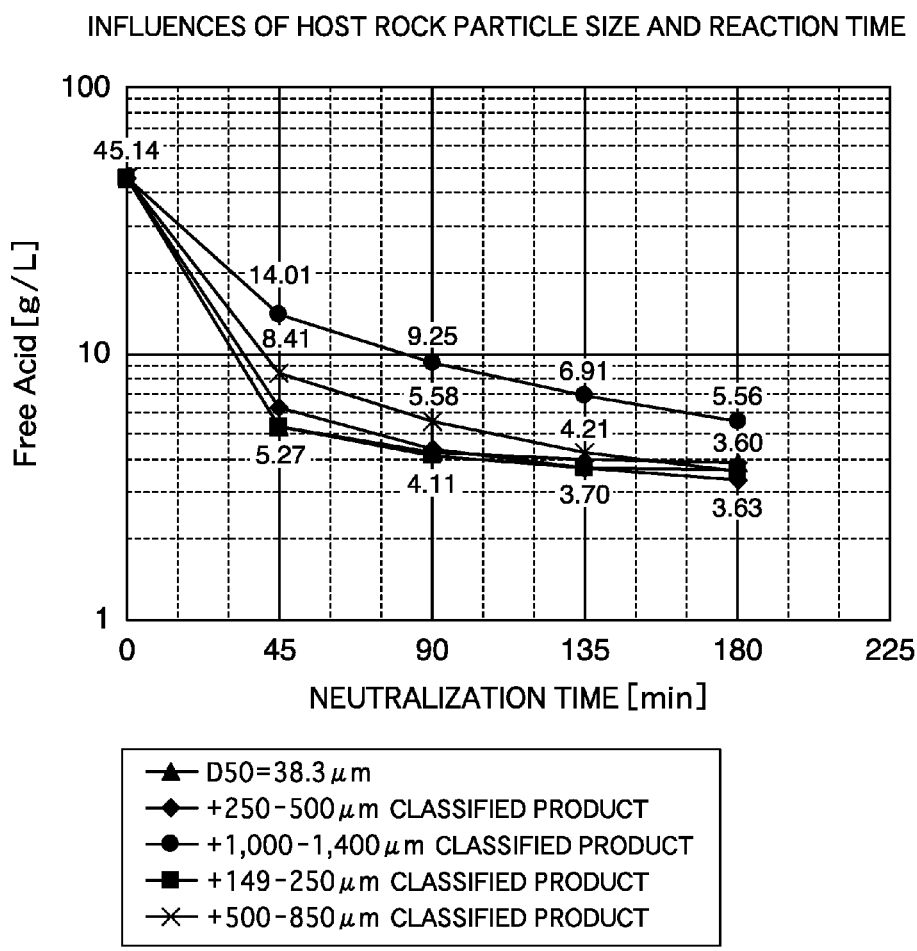
FIG. 3 is a view illustrating a relation of a particle size of a host rock and a neutralization time in an embodiment.

A relation between the particle size at that time and a neutralization reaction time is illustrated in FIG. 3. It is found that, if the particle size of the host rock is in a range less than 500 μm, a great difference is not present in neutralizing ability of the host rock, but the concentration of the free acid is not reduced to 4 g/L in the range that exceeds 500 μm even when the free acid is treated at 90° C. for 90 minutes, and the neutralizing ability is reduced.

Further, when the free acid was neutralized until it became the concentration of 4 g/l, a slurry in which magnesium hydroxide had a concentration of 200 g/L was added. Thereby, as illustrated in Table 5, it was possible to accurately neutralize a remaining free acid until it became a concentration of 0.3 to 0.8 g/l, and to avoid generating unnecessary sediment.

TABLE 5

| | | Sample 1 | Sample 2 | Sample 3 |
|---|---|---|---|---|
| After first stage neutralization | free acid after reaction [g/L] | 4.1 | 3.7 | 4.4 |
| | pH | 1.8 | 1.9 | 1.8 |
| Second stage neutralization | Temperature [° C.] | 70 | 70 | 61 |
| | Time [min] | 14 | 10 | 10 |
| After second stage neutralization | free acid after reaction [g/L] | 0.3 | 0.8 | 0.5 |
| | pH | 2.2 | 2.3 | 2.4 |

DRAWINGS

FIG. 1
1: ORE
2: SULFURIC ACID
3: LEACHATE
4: NEUTRALIZER
5: HOST ROCK
6: CLASSIFICATION
7: NEUTRALIZATION
8: NEUTRALIZATION STEP
9: LEACH SLURRY
10: SOLID-LIQUID SEPARATION STEP
11: SOLID-LIQUID SEPARATION
12: LEACH RESIDUE
13: LEACHATE
14: NEUTRALIZER
15: NEUTRALIZATION
16: HEMATITE RECOVERY PLANT
17: CLASSIFICATION (WET CLASSIFICATION)
18: CLASSIFICATION STEP
19: VALUABLE METALS
20: IRON OXIDE FOR IRONMAKING (HEMATITE)
21: DRAINAGE TREATMENT

FIG. 2
1: LEACHATE
2: NEUTRALIZATION STEP
3: CLASSIFICATION
4: NEUTRALIZER
5: HOST ROCK
6: FIRST NEUTRALIZATION PROCESS
7: DETERMINE CONCENTRATION OF FREE ACID
8: NEUTRALIZER
9: SECOND NEUTRALIZATION PROCESS
10: LEACH SLURRY

FIG. 3
1: INFLUENCES OF HOST ROCK PARTICLE SIZE AND REACTION TIME
2: NEUTRALIZATION TIME
3: CLASSIFIED PRODUCT
4: CLASSIFIED PRODUCT
5: CLASSIFIED PRODUCT
6: CLASSIFIED PRODUCT

The invention claimed is:

1. A method of producing (high-purity) hematite for ironmaking by a process of adding a mineral acid and an oxidant to ore containing iron and valuable metals and then leaching the valuable metals under high pressure and high temperature to form a leachate, the method further comprising the following steps (1) to (3):

(1) a neutralization step of performing a two-stage neutralization process on to form a leach slurry, the two-stage neutralization having a first neutralization process in which magnesium oxide is used as the neutralizer, and following the first neutralization, a second neutralization in which magnesium hydroxide is used as the neutralizer depending on the concentration of free acid in the leachate;

(2) a solid-liquid separation step of separating the leach slurry obtained in the neutralization step into a leach residue and leachate; and (3) a classification step of classifying the leach residue into hematite and gangue components.

2. The method of claim 1, wherein the magnesium oxide is a host rock.

3. The method of claim 1, wherein the magnesium oxide is magnesium oxide obtained by acid leaching oxide ore containing magnesium, crystallizing a magnesium salt from the leachate, and performing oxidizing roasting on the salt.

4. The method of claim 1, wherein the neutralizer supplied in the neutralization step is a neutralizer sieved in a particle size range from 10 μm to 500 μm.

5. The method of claim 1, wherein the classification of the leach residue in the classification step is performed using a wet cyclone.

6. The method of claim 1, wherein the classification of the leach residue in the classification step is performed by selecting a sieve mesh to be sieved so as to be in a range of 5 μm or less.

7. The method of claim 1, wherein the ore containing iron and valuable metals is any of nickel oxide ore, nickel sulfide ore, and copper sulfide ore.

* * * * *